(12) United States Patent
Kanai (10) Patent No.: US 8,531,599 B2
(45) Date of Patent: Sep. 10, 2013

(54) APPARATUS, METHOD AND SYSTEM FOR FRAME RATE CONVERSION OF PARTIAL IMAGE

(75) Inventor: Izumi Kanai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 12/707,377

(22) Filed: Feb. 17, 2010

(65) Prior Publication Data

US 2010/0214473 A1    Aug. 26, 2010

(30) Foreign Application Priority Data

Feb. 23, 2009   (JP) .................................. 2009-039033

(51) Int. Cl.
*H04N 7/01*    (2006.01)
*H04N 5/228*   (2006.01)

(52) U.S. Cl.
USPC ...................................... 348/441; 348/208.4

(58) Field of Classification Search
USPC ................................................. 348/441, 452
See application file for complete search history.

(56) References Cited

U.S. PATENT DOCUMENTS

| | | | |
|---|---|---|---|
| 5,642,170 A | 6/1997 | Hackett et al. | |
| 2003/0174220 A1* | 9/2003 | Ito | 348/240.2 |
| 2009/0207259 A1* | 8/2009 | Ito et al. | 348/208.4 |

FOREIGN PATENT DOCUMENTS

| | | |
|---|---|---|
| JP | 07-162811   | 6/1995 |
| JP | 11-041500 A | 2/1999 |
| JP | 2006-215657 A | 8/2006 |

OTHER PUBLICATIONS

The above references were cited in a Jan. 11, 2011 Japanese Office Action, issued in Japanese Patent Application No. 2009-039033.

* cited by examiner

*Primary Examiner* — Richard Torrente
(74) *Attorney, Agent, or Firm* — Cowan, Liebowitz & Latman, P.C.

(57) ABSTRACT

An image display system having a generation unit to generate a video signal which is composed of a partial image cut out from a still image; and a display unit to display a video signal inputted from said generation unit at a frame rate higher than that of said inputted video signal by creating an interpolated frame based on a motion vector, wherein said generation unit has a movement unit to move a cut-out position of said partial image, and an output unit to output movement information including at least information indicative of the direction of movement of said cut-out position together with said video signal, and wherein said display unit has a setting unit to set a motion vector used for the creation of said interpolated frame by using said movement information.

12 Claims, 7 Drawing Sheets

FIG. 3

| SIGNAL T2 | THE DIRECTION OF MOVEMENT |
|---|---|
| 0 | UP |
| 1 | DOWN |
| 2 | RIGHT |
| 3 | LEFT |

APPARATUS, METHOD AND SYSTEM FOR FRAME RATE CONVERSION OF PARTIAL IMAGE

BACKGROUND OF THE INVENTION

1. Field of the Invention

The present invention relates to an image display system, an image display apparatus, and a control method for an image display apparatus, in which a video signal is displayed by converting the frame rate thereof.

2. Description of the Related Art

When appreciating on a television set a picture photographed by a digital camera (photographed image), a partial region (cut-out region) of the photographed image may be cut out and displayed on the full screen of the television set. At this time, the cut-out position (the position of the region cutout from the photographed image) may be moved by a cursor key of a digital camera main body, etc., so that various regions in the photographed image can be appreciated.

In addition, a partial region of the photographed image can be cut out and printed on paper, etc. At this time, in order to check the cut-out region, the television set can be connected to a printer so that the cut-out region can be displayed on the full screen of the television set. Even in such a case, the cut-out position can be moved by a cursor key of the printer, etc., so that a region to be printed is determined.

On the other hand, some television sets perform frame rate conversion (FRC) for the purpose of a flicker countermeasure or the improvement of animation response. For example, the FRC detects a motion vector from frame images being inputted, creates an interpolated frame by the use of the detected motion vector, and converts the frame rate thereof from 60 Hz into 120 Hz.

In cases where the digital camera and the television set are connected to each other, or in cases where the printer and the television set are connected to each other, a video signal of a photographed image is inputted to the television set at a frame rate of 60 Hz. The television set creates interpolated frames from the video signal that is inputted at 60 Hz, and displays the video signal at a frame rate of 120 Hz. When a user moves the position of the cut-out region by means of a cursor key or the like, it becomes difficult to detect a motion vector because the moving speed (motion in the video displayed on the television set) of the cut-out position is generally fast. At this time, there has been a problem that when an interpolated frame is created by using an incorrect motion vector, an image of the interpolated frame is disturbed (a disturbance such as noise occurs in the video being currently appreciated). Here, note that the movement of the position of a cut-out region is equivalent to the change of a region to be cut.

A conventional technology in view of such a problem is disclosed in Japanese patent application laid-open No. H07-162811, for example. Specifically, in a method disclosed in Japanese patent application laid-open No. H07-162811, the same image as that of an original frame is used as an interpolated frame in a region in which the detection of a motion vector is difficult because the moving speed of a video being displayed is fast. Then, the disturbance of an image is blurred by applying an LPF (low pass filter) to the interpolated frame created in this manner.

SUMMARY OF THE INVENTION

As stated above, the method of Japanese patent application laid-open No. H07-162811 is to blur the disturbance of the image of an interpolated frame by applying the LPF to the interpolated frame, in order to reduce the disturbance of the video due to the FRC. However, the detail minuteness and clarity of the video will be decreased by providing a blurred display of the video while applying the LPF to the interpolated frame. Accordingly, with the method of Japanese patent application laid-open No. H07-162811, it is even possible to suppress the disturbance produced in the interpolated frame itself, but the quality of the displayed video is deteriorated. That is, a merit of the frame rate conversion, i.e., displaying a video which is more minute and better at motion, by generating interpolated frames to improve the frame rate, will be reduced.

The present invention has been made in view of the above-mentioned actual circumstances, and has for its object to provide a technique in which, in a configuration in which a part of an image is cut out and the image in a region thus cut out is inputted as a video signal to a display apparatus, it is possible to suppress the degradation in the quality of a displayed video as much as possible even if an interpolated frame is created to perform frame rate conversion by using a motion vector, with respect to a video generated during an operation of moving the position of the cut-out region.

An image display system according to the present invention comprising:

a generation unit to generate a video signal which is composed of a partial image cut out from a still image; and a display unit to display a video signal inputted from said generation unit at a frame rate higher than that of said inputted video signal by creating an interpolated frame based on a motion vector;

wherein said generation unit comprises:

a movement unit to move a cut-out position of said partial image; and an output unit to output movement information including at least information indicative of the direction of movement of said cut-out position together with said video signal; and wherein said display unit has a setting unit to set a motion vector used for the creation of said interpolated frame by using said movement information.

An image display apparatus which is connectable to a video output apparatus that outputs a video signal, and which displays the video signal inputted from said video output apparatus at a frame rate higher than that of said inputted video signal by creating an interpolated frame based on a motion vector, according to the present invention, said image display apparatus comprising:

an acquisition unit to acquire, from said video output apparatus, movement information which at least includes information indicating the direction of movement of the cut-out position of a partial image, together with said video signal composed of a partial image cut out from a still image; and a setting unit to set a motion vector used for the creation of said interpolated frame by using said movement information.

A control method of an image display apparatus which is connectable to a video output apparatus that outputs a video signal, and which displays the video signal inputted from said video output apparatus at a frame rate higher than that of said inputted video signal by creating an interpolated frame based on a motion vector, according to the present invention, said control method comprising the steps of:

acquiring, from said video output apparatus, movement information which at east includes information indicating the direction of movement of the cut-out position of a partial image, together with said video signal composed of a partial image cut out from a still image; and setting a motion vector used for the creation of said interpolated frame by using said movement information.

According to the present invention, it is possible to provide a technique in which, in a configuration in which a part of an image is cut out and the image in a region thus cut out is inputted as a video signal to a display apparatus, the degradation in the quality of a displayed video can be suppressed as much as possible even if an interpolated frame is created to perform frame rate conversion by using a motion vector, with respect to a video generated during an operation of moving the position of the cut-out region.

Further features of the present invention will become apparent from the following description of exemplary embodiments with reference to the attached drawings.

DESCRIPTION OF THE EMBODIMENT

Hereinafter, specific embodiments of the present invention will be described.

First Embodiment

Figure 1:
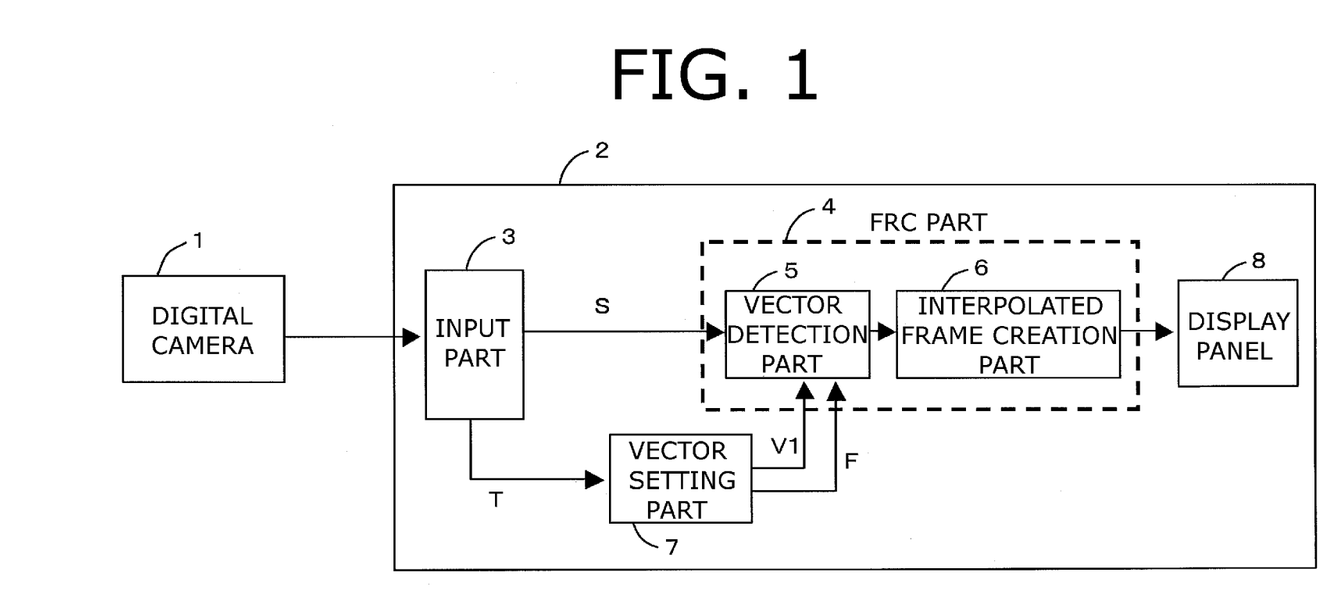
FIG. 1 is a block diagram of an image display system according to a first embodiment.

FIG. 1 is a block diagram of an image display system according to a first embodiment. The image display system according to this embodiment is composed of a digital camera 1 (video output apparatus) and a television set 2 (image display apparatus) that is able to be connected to the video output apparatus. The digital camera 1 generates and outputs a video signal which is formed of a partial image (a part of a photographed image) cut out from a photographed image (still image). The television set 2 displays the video signal inputted from the digital camera 1 at a frame rate higher than that of the inputted video signal by creating interpolated frames based on motion vectors which are generated by analyzing the inputted video signal. As shown in FIG. 1, the television set 2 has an input part 3, an FRC part 4, a vector setting part 7, and a display panel 8. In addition, the digital camera 1 has a moving operation part and an output part, both of which are not illustrated.

Here, note that in this embodiment, the digital camera 1 and the television set 2 are assumed to be connected to each other by means of a connection system which is able to transmit the video signal and additional information. In addition, the connection between the digital camera 1 and the television set 2 may be a connection using a metal cable, an optical fiber cable, etc., or may be a wireless connection using ZigBee (trademark), Bluetooth (trademark), a wireless LAN of an IEEE 802.11 system, etc. The video signal and additional information may be able to be transmitted (the video signal and additional information may be transmitted by individual cables (transmission units), respectively). Moreover, as stated above, in this embodiment, a situation is assumed in which a partial region (a cut-out region; a partial image) of one photographed image (still image) is cut out and displayed on the full screen of the television set 2. Also, it is assumed that a user appreciates or views various regions in the photographed image by moving the cut-out position of the partial image by means of the unillustrated moving operation part (e.g., a cursor key) which is provided on the digital camera 1. It is further assumed that the digital camera 1 outputs a video signal at a frame rate of 60 Hz.

The output part (of the digital camera 1) outputs movement information on the movement of the cut-out position as additional information T, together with the video signal.

The movement information T includes at least information which indicates the direction of movement of the cut-out position, and in this embodiment, it is assumed that the movement information T includes the following three kinds of information (signals) and is transmitted to the input part 3 together with the video signal.

(1) Instructional information indicating whether the movement of the cut-out position is instructed (signal T1).

(2) Directional information indicating the direction of movement of the cut-out position (signal T2).

(3) Speed information indicating the speed of movement of the cut-out position (signal T3).

In this embodiment, it is assumed that the signal T1 becomes 1 (T1=1) at the time when the user instructs the movement of the cut-out position by means of the cursor key attached to the digital camera 1, etc., whereas the signal T1 becomes 0 (T1=0) at the time when the user does not instruct the movement of the cut-out position.

Figure 3:
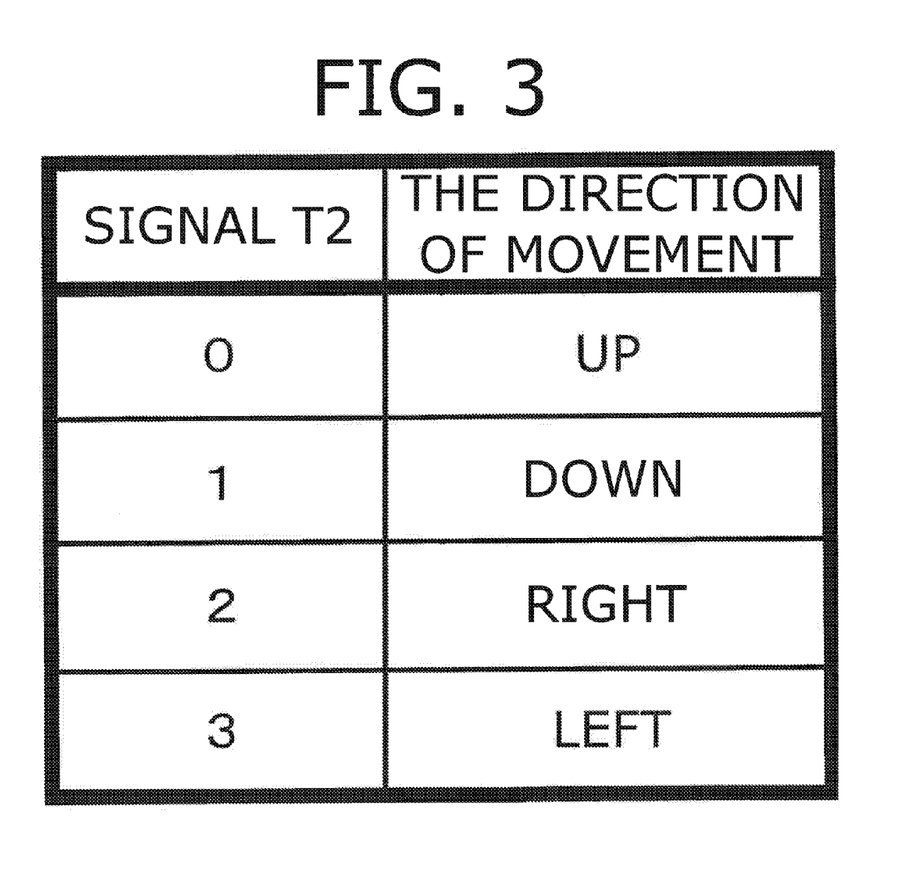
FIG. 3 is a view showing an example of a signal T2.

The signal T2 is assumed to be a signal indicating four kinds of directions, i.e., "up", "down", "right", and "left" directions. Specifically, in the case of the cut-out position being moved in an "up" direction, the signal T2 becomes 0 (T2=0); in the case of the cut-out position being moved in a "down" direction, the signal T2 becomes 1 (T2=1); in the case of the cut-out position being moved in a "right" direction, the signal T2 becomes 2 (T2=2); and in the case of the cut-out position being moved in a "left" direction, the signal T2 becomes 3 (T2=3) (FIG. 3).

The signal T3 is a numerical value (scalar value) indicating the number of pixels by which the cut-out position moves within the period of one frame (1/60 seconds).

The input part 3 acquires the movement information T from the digital camera 1 together with a video signal S. Then, the input part 3 outputs the video signal S to the FRC part 4, and the movement information T to the vector setting part 7, respectively. In this embodiment, the video signal whose frame rate is 60 Hz is inputted to the input part 3, and hence the frame rate of the video signal outputted from the input part 3 is also 60 Hz. The frame rate is converted from 60 Hz to 120 Hz in the FRC part 4.

The FRC part 4 is composed of a vector detection part 5 and an interpolated frame creation part 6. In this embodiment, the interpolated frame creation part 6 creates as an interpolated frame an image (intermediate image) for compensating between two frames continuous in time, based on a motion vector outputted from the vector detection part 5. As a result, the frame rate is converted from 60 Hz to 120 Hz.

Figure 2:
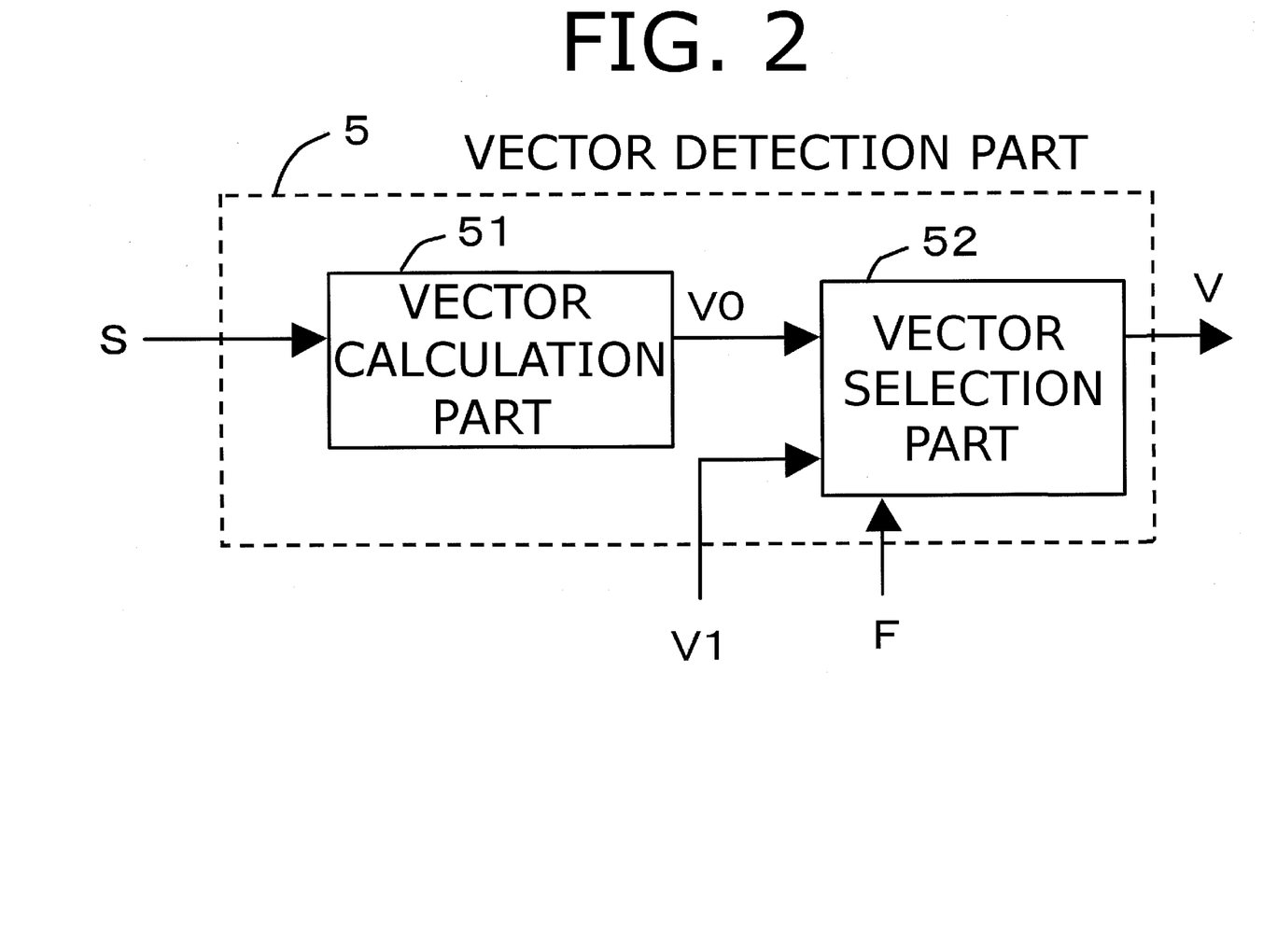
FIG. 2 is a detail view of a vector detection part according to the first embodiment.

The detail of the vector detection part 5 is shown in FIG. 2. The vector detection part 5 is composed of a vector calculation part 51 and a vector selection part 52.

The vector calculation part 51 calculates a motion vector according to a block matching method by using two frames continuous in time. Specifically, an image for one frame inputted (an inputted image) is divided into a plurality of blocks (reference blocks), and is subjected to pattern matching for each block with an image of a temporally continuous frame (preceding frame image) preceding by 1/60 seconds. In other words, a search for a block having a high degree of coincidence (corresponding block) with the pixel value of a reference block is made from preceding frame images (here, it is assumed that the more similar the pixel value, the higher value the degree of coincidence shows). Then, for each reference block, a vector from the reference block to a corresponding block is detected as a motion vector. Subsequently, an image of an interpolated frame, which is an intermediate image, is divided into a plurality of blocks, similar to the inputted image, and a motion vector V0 in each block of the interpolated frame is obtained from the motion vector detected for each reference block. For example, the magnitude of the detected motion vector is set to one half. Here, note that in this embodiment, the size of each block is set to 16 pixels×16 pixels, but the block size is not limited to this. For example, the block size may be 8 pixels×8 pixels, or 32 pixels×32 pixels, etc.

In addition, a motion vector V1 and a flag F are inputted to the vector detection part 5 (more specifically, the vector selection part 52) from the vector setting part 7. The motion vector V1 is a motion vector that is used in common in all the blocks at the time when an interpolated frame is created. Specifically, the motion vector V1 is a motion vector that is set by the motion vector setting part 7 with the use of movement information. Also, the flag F indicates whether the movement of the cut-out position is instructed. The details of the motion vector V1 and the flag F will be described later.

The motion vector selection part 52 selects either the motion vector calculated by the vector calculation part 51 or the motion vector set by the vector setting part 7, as a motion vector used for the creation of an interpolated frame. Specifically, in cases where it is determined by the movement information that the video signal to be inputted is a video signal of which the cut-out position has been moved, the motion vector set by the vector setting part 7 is selected. In this embodiment, the motion vector selection part 52 outputs the motion vector V0 or V1 by switching them according to the flag F. The flag F is a signal that is transmitted once for one frame, and is a one-bit signal that takes a value of 0 or 1. The vector selection part 52 outputs (selects) the motion vector V0 at the time of the flag F being 0 (F=0), and outputs (selects) the motion vector V1 at the time of the flag F being 1 (F=1).

The motion vector V (V0 or V1) outputted from the vector selection part 52 is inputted to the interpolated frame creation part 6. In the interpolated frame creation part 6, an interpolated frame is created from two temporally continuous frames and the motion vector V, and a video signal is outputted at a frame rate of 120 Hz.

The video signal outputted from the interpolated frame creation part 6 is displayed on the display panel 8. In this embodiment, the video with a frame rate of 120 Hz is displayed on the display panel 8. In this embodiment, the video signal outputted from the digital camera 1 is a static or still image. Accordingly, in cases where a partial image obtained by cutting out a part of the still image is outputted as a video signal, the video signal inputted to the television set 2 always becomes the same image unless the cut-out region is changed. Because there is no change between these images, a motion vector therebetween is theoretically zero.

Subsequently, reference will be made to an example of the operation of the image display system (control method for the image display apparatus) according to this embodiment.

When the user instructs the movement of the cut-out position by means of the cursor key or the like provided on the digital camera 1, the signal T1 contained in the movement information T becomes 1 (T1=1).

Then, in cases where the user gives an instruction to move the cut-out position in an upward direction so that the cut-out position is moved by 10 pixels per frame, the signal T2 becomes 0 (T2=0), and the signal T3 becomes (T3=10).

When it is detected that the signal T1 is 1, the vector setting part 7 decides (sets) the motion vector V1 by the use of directional information (signal T2) and speed information (signal T3).

Figure 4:
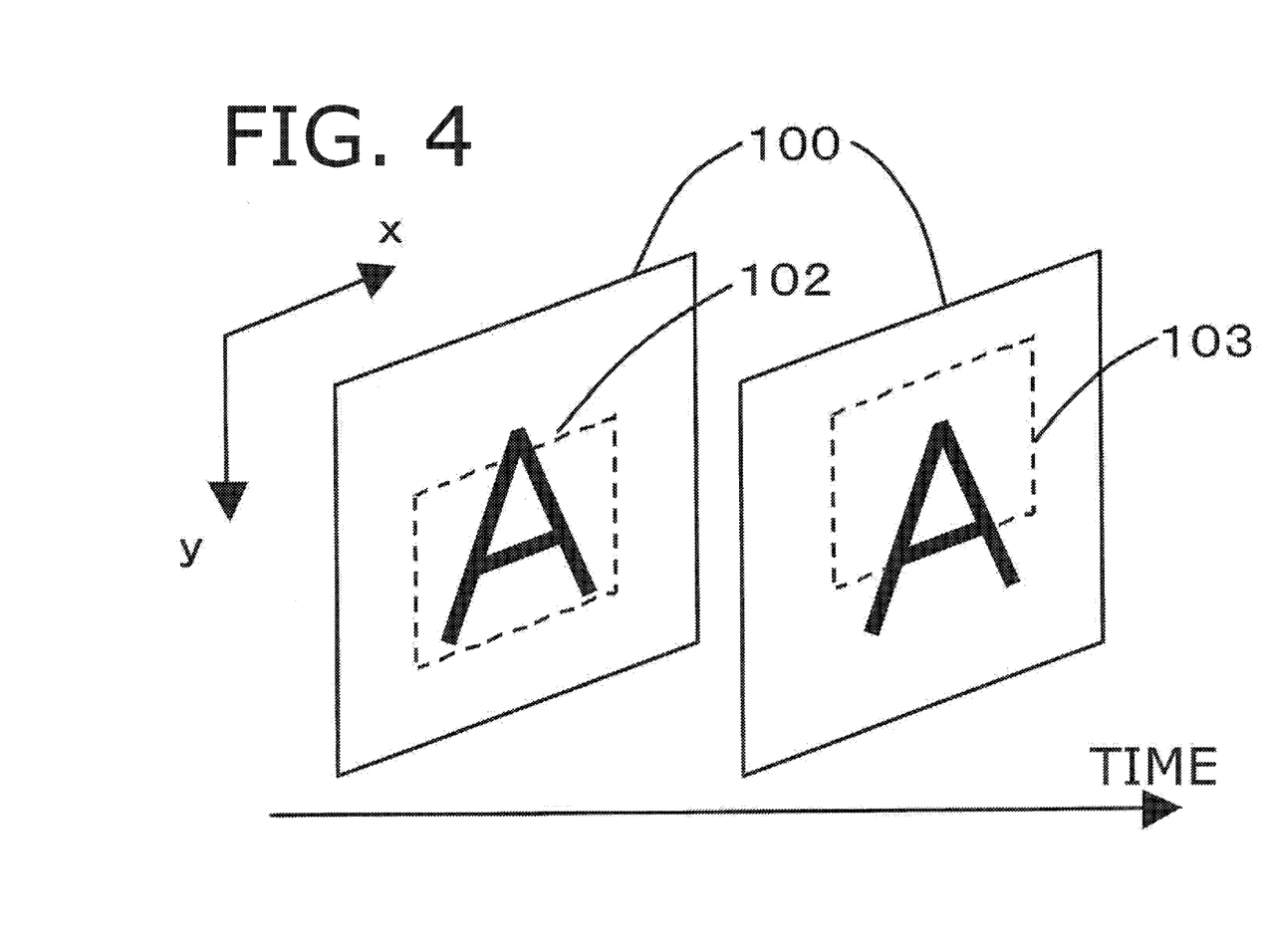
FIG. 4 is a view explaining a process in which a motion vector V1 is set in the first embodiment.

FIG. 4 is a view explaining a process to set the motion vector V1. In FIG. 4, 100 denotes a photographed image. In addition, regions 102 and 103 denoted by broken lines, respectively, are cut-out regions (partial images) within the photographed image 100. Specifically, the region 103 is a cut-out region after 1/60 seconds from the region 102. The digital camera 1 outputs a video signal containing the regions 102, 103 as single frames, respectively, to the television set 2.

Because the cut-out position moves upwards at the time of the signal T2 being 0 (T2=0), the video displayed on the display panel 8 moves downward. Accordingly, in the case of the signal T3 being 10 (T3=10), the motion vector V1 is represented by the following formula.

$$V1=(0,10) \quad \text{(Formula 1)}.$$

The vector setting part 7 outputs the motion vector V1 and the flag F to the vector selection part 52 in the vector detection part 5. In cases where the video signal to be inputted is a video signal of which the cut-out position has been moved, i.e., in the case of the signal T1 being (T1=1), the flag F becomes 1 (F=1). On the other hand, in cases where the video signal to be inputted is not a video signal of which the cut-out position has been moved, i.e., in the case of the signal T1 being 0 (T1=0), the flag F becomes 0 (F=0). The motion vector V1 and the flag F are signals which are outputted once per frame. Here, note that in the case of F=0, V1 need not be outputted, or V1=(0, 0) may be outputted.

The vector selection part 52 outputs the motion vector V by making the following selection according to the flag F.

In the case of F=0:V=V0,

In the case of F=1:V=V1.

The interpolated frame creation part 6 creates an interpolated frame using the motion vector V outputted from the vector detection part 5. In this embodiment, in cases where the video signal to be inputted is a video signal of which the cut-out position has been moved, the motion vector V becomes V1 in all the blocks of one frame. Accordingly, a correct motion vector is set in all the blocks in comparison with the case in which a motion vector is obtained by analyzing frame images. Therefore, even in cases where there occurs a change in the video based on the movement of the cut-out position, it is possible to suppress as much as possible the degradation in the quality of the displayed image in the video of which the frame rate has been converted.

Second Embodiment

Now, reference will be made, as a second embodiment, to the case in which OSD (onscreen display) information such as a date, etc., is superimposed on a part of a partial image (i.e., the case in which a partial image contains a superimposition image that is superimposed thereon at a predetermined position in the partial image).

In the case of the superimposition of OSD information, it is general that the OSD information does not move even if a cut-out position is moved.

In cases where the cut-out position is moved, if a motion vector set using directional information and speed information is also assigned to a region where OSD information is superimposed, as in the first embodiment, the OSD information (e.g., characters, etc.) becomes a double image. This is not desirable because the double image of OSD information such as characters with high contrast becomes a video or picture very hard to see. Accordingly, in this embodiment, the FRC part 4 outputs the same image as the inputted image to a region (OSD region) where the OSD information s superimposed (twice outputting processing). As a result, the displaying of the video hard to see as mentioned above is suppressed.

Figure 5:
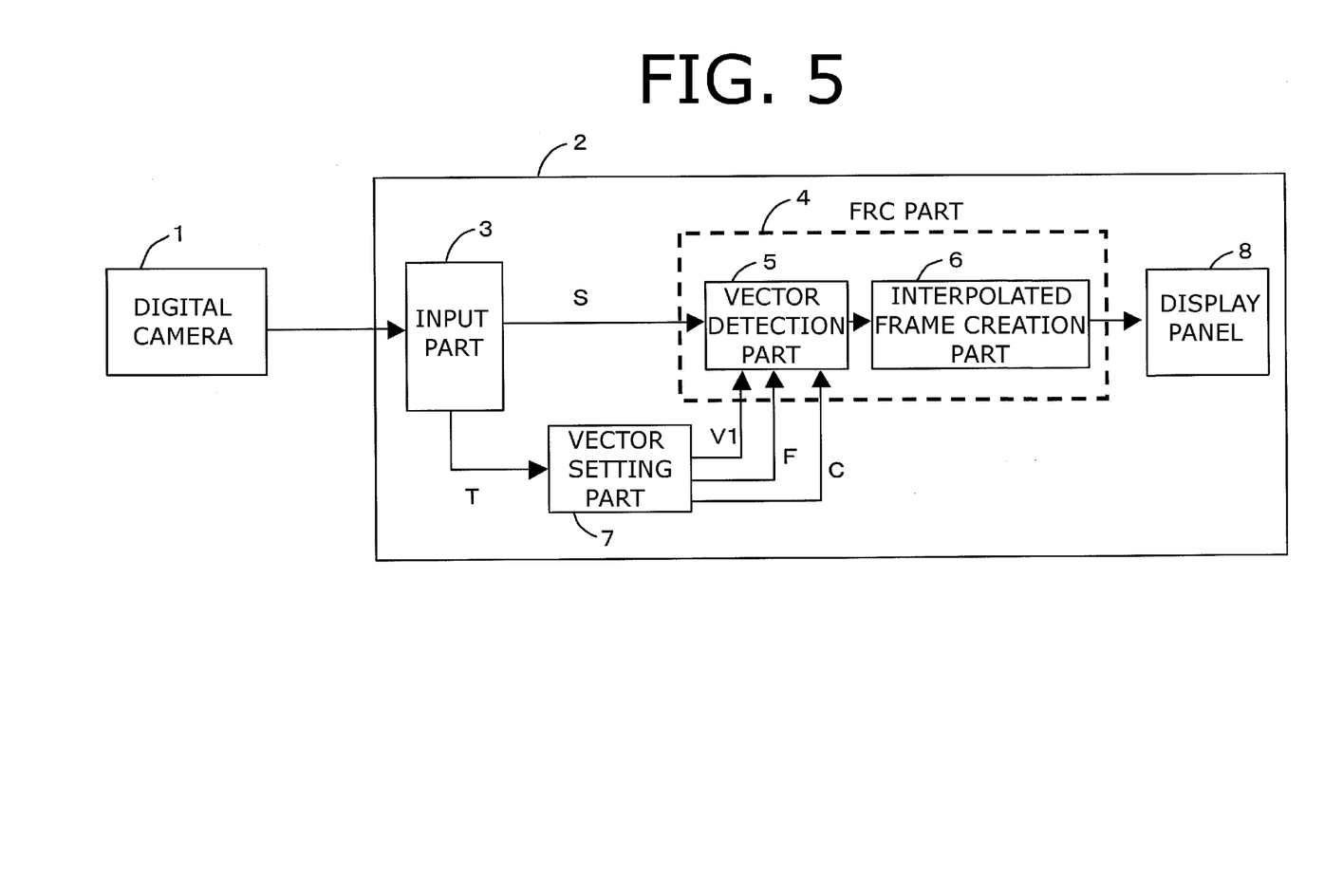
FIG. 5 is a block diagram of an image display system according to a second embodiment.

FIG. 5 is a block diagram of an image display system according to this second embodiment. FIG. 5 is basically the same as the block diagram (FIG. 1) of the f first embodiment, but differs therefrom in that information C is added to the signals outputted from the vector setting part 7 to the vector detection part 5. The information C is information which indicates a region (zero vector region) using a motion vector with a magnitude of 0 at the time of creating an interpolated frame.

Hereinafter, reference will be made to a difference between the operation of the image display system (control method for the image display apparatus) according to this embodiment and that of the first embodiment.

The additional information T of this embodiment is assumed to further include, in addition to the movement information (signals T1 through T3) described in the first embodiment, (4) regional information (signal T4) which indicates a region where a superposition image is superposed. In this embodiment, the signal T4 indicates a start point coordinate and an end point coordinate of the OSD region. The coordinates are coordinates in the case where an upper left corner of a cut-out region is set as an origin (0, 0), for example.

Figure 6:
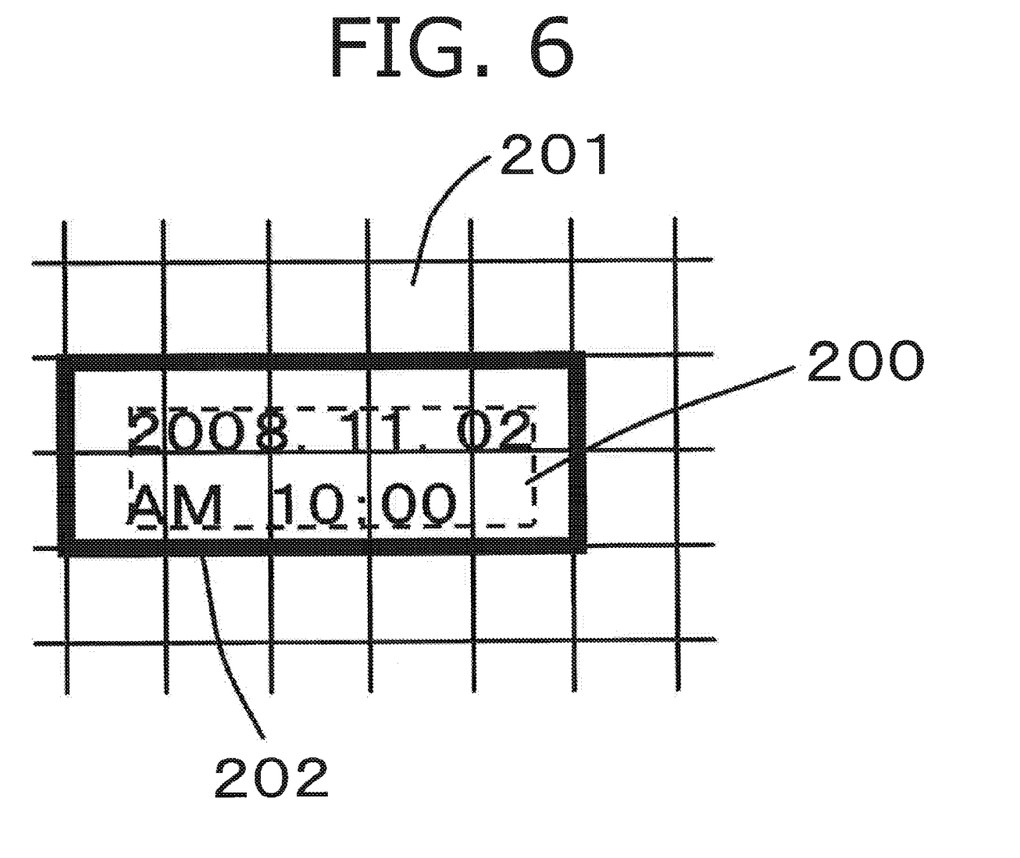
FIG. 6 is a view showing an area in which OSD (onscreen display) information is superimposed in a cut-out region.

FIG. 6 is a view showing a region in which OSD (onscreen display) information is superposed in a cut-out region. In FIG. 6, a region 200 surrounded by a broken line represents an OSD region defined by the signal T4. A region 201 surrounded by a thin line represents a block of an interpolated frame. A region 202 surrounded by a thick line represents a block in which OSD information is superimposed and hence outputted twice (the magnitude of a motion vector is made 0).

The vector setting part 7 sets a motion vector used for the creation of an interpolated frame by using the movement information, and at the same time sets a zero vector region by using the regional information. Specifically, the vector setting part 7 detects a region (zero vector region) containing a superimposition image by using the signal T4, and outputs the information C representing the zero vector region to the vector detection part 5. In this embodiment, blocks including at least a part of the OSD region are detected as the zero vector region. In the case of FIG. 6, ten blocks indicated by the region 202 are detected. Then, the vector setting part 7 outputs the position information (position coordinates, an identifier, etc., of each block) of the ten blocks thus detected to the vector detection part 5 as the information C. The information C is a signal outputted once per frame. The explanation of a setting method for the motion vector using the movement information is omitted because it is the same as that of the first embodiment.

Figure 7:
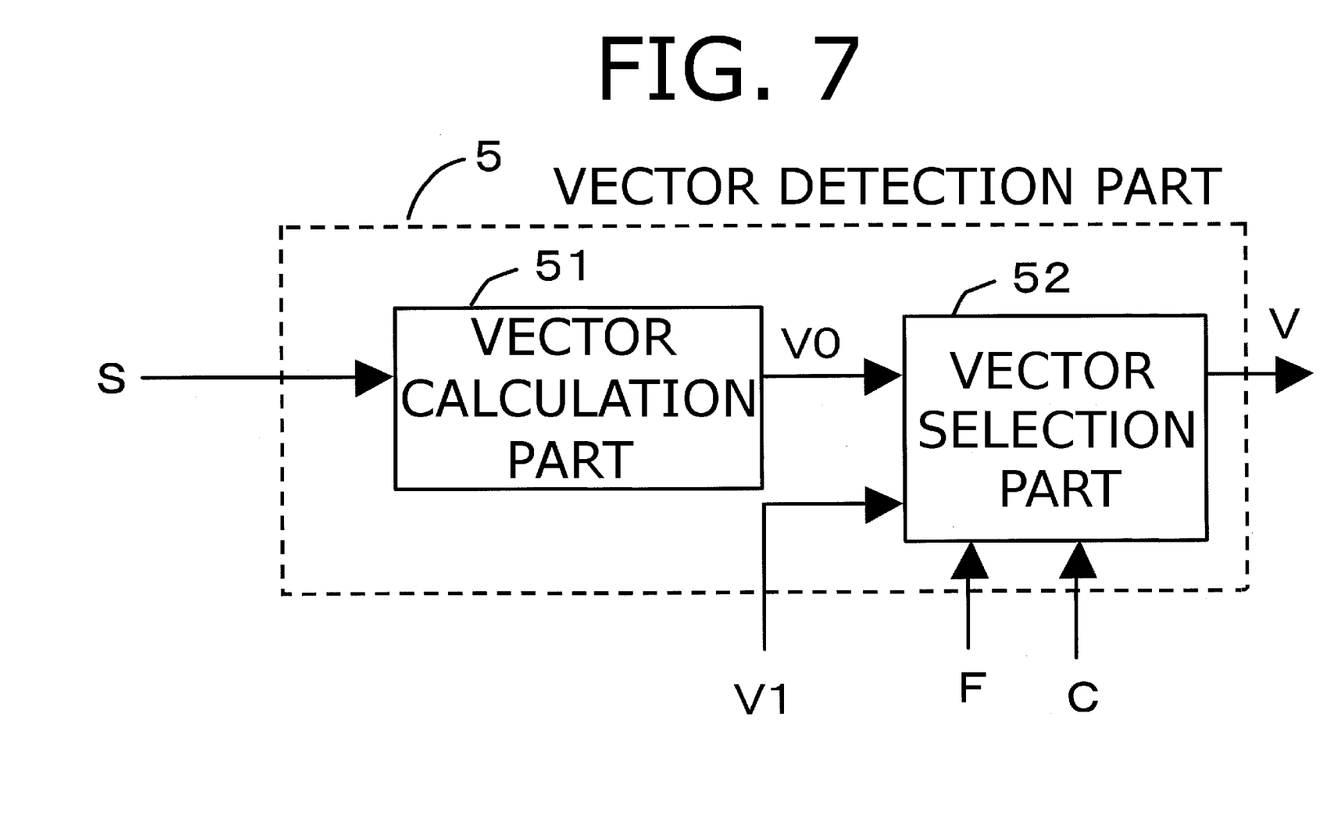
FIG. 7 is a detail view of a vector detection part according to the second embodiment.

The detail of the vector detection part 5 is shown in FIG. 7. The difference of the vector detection part 5 (FIG. 7) of this second embodiment from that (FIG. 2) of the first embodiment is that the information C is inputted to the vector selection part 52.

In the case of the flag F being 1 (F=1), the vector selection part 52 outputs a motion vector V for the blocks designated by the information C as a zero vector (i.e., a vector which is outputted twice), and also outputs a motion vector V1 for the other blocks. In addition, in the case of F=0, it is the same as that of the first embodiment. Thus, the motion vectors outputted from the vector selection part 52 are summarized as follows.

In the case of F=0:V=V0,
In the case of F=1:
The blocks designated by the information C: V=(0, 0),
The blocks not designated by the information C: V=V1.

Thus, in this embodiment, in cases where the motion vector set by the vector setting part 7 is selected, a motion vector having a magnitude of 0 is used within the zero vector region at the time of creating an interpolated frame. Then, in regions other than the zero vector region, the motion vector set by the vector setting part 7 is used. As a result, a portion in which a superimposition image is displayed is outputted twice, so it is possible to suppress the double image of the superimposition image. The term "outputted twice" is the technique of displaying the same video twice in succession in the FRC. In addition, because in the regions other than the zero vector region, the motion vector V1 set by the vector setting part 7 is used, it is possible to obtain the same effects as those clue to the first embodiment.

As described above, according to the above-mentioned two embodiments, by setting a motion vector using information on the movement of a cut-out position, in a configuration in which a part of an image is cut out, and the image in a region thus cut out is inputted as a video signal to a display apparatus, it is possible to suppress the degradation in the quality of a displayed image as much as possible even if the frame rate is converted with respect to a video generated during an operation of moving the position of the cut-out region.

In addition, in order to obtain the above-mentioned effects, V1 need only be selected in cases where the movement of the cut-out position is instructed. In the above-mentioned embodiments, V0 is selected in cases where the movement of the cut-out position is not instructed, so an interpolated frame can be created by using a suitable motion vector according to the situation. For example, in cases where a video signal such as a movie (animation) which is not a partial image is displayed and checked, interpolated frames are created by using motion vectors that are obtained by a general method.

Although in the above-mentioned embodiments, reference has been made to the case in which the video output apparatus is a digital camera, the video output apparatus is not limited to such a digital camera. The video output apparatus according to each of the above-mentioned embodiments can be applied to an apparatus (e.g., a printer, etc.) which output a video signal to an image display apparatus. In the case of using a printer as the video output apparatus, it can be considered that a user instructs the movement of a cut-out position by a cursor key of the printer.

Moreover, these embodiments can be applied to the case in which a medium with image data stored thereon is inserted into a card slot formed in the television set 2 so that the image data is acquired from the medium. In this case, it can be considered that the video output apparatus is present in the television set 2, and the user instructs the movement of a cut-out position by means of a cursor key attached to a TV remote control.

Although in the above-mentioned embodiments, reference has been made to the configuration in which the frame rate of a video signal is converted from 60 Hz to 120 Hz, the frame rate of a video signal to be inputted and the frame rate of a video signal to be outputted (to be displayed on a display panel) are not limited to these. For example, the frame rate of the video signal to be inputted may be 40 Hz, or may be 80 Hz. Also, the frame rate of the video signal to be outputted may be 80 Hz, or may be 160 Hz. If two interpolated frames are created between two temporally adjacent frames, the frame rate can also be made three times as high as the original frame rate.

Although in the above-mentioned embodiments, reference has been made to the case in which a user instructs the movement of a cut-out position, an instruction for the movement of a cut-out position may be generated within a video output apparatus. For example, in cases where a video output apparatus outputs a video signal composed of a partial image to an image display apparatus, the video output apparatus may have a function to move the cut-out position of the partial image in an automatic manner.

Although in the above-mentioned embodiments, reference has been made to the configuration in which movement information includes T1 through T3, the movement information is not limited to this. For example, if movement information includes the direction of movement and the speed of movement, it is possible to grasp whether the movement of a cut-out position is instructed. In addition, if movement information includes information indicating a cut-out position, whether the movement of the cut-out position is instructed, as well as the direction of movement and the speed of movement, can be grasped from a difference in position between two frames.

Further, in the above-mentioned embodiments, it is assumed that the vector setting part 7 outputs the flag F according to the signal T1 to the vector selection part 52, but the input part 3 may output the flag F to the vector selection part 52 as the signal T1. Also, as stated above, whether the movement of the cut-out position is instructed can be grasped from the information which indicates the direction of movement, the speed of movement, and the cut-out position, etc., so the flag F may be generated from those pieces of information.

In addition, in the above-mentioned embodiments, the signal T2 is assumed to be a signal which indicates four kinds of directions, "up", "down", "right", and "left", but the number of directions indicated by the signal T2 may be more or less than this. For example, the signal T2 may be a signal which indicates eight kinds directions including "upper right", "lower right", "upper left", and "lower left", or may be a signal indicating two kinds of directions, "up and down (vertical)" and "right and left (horizontal)".

Here, note that in the above-mentioned embodiments, it is configured such that the image display apparatus has the vector detection part, but incases where a video signal generated frame still image is displayed, there is no motion in the video if the movement of the cut-out position is not instructed. Therefore, in cases where the movement of the cut-out position is not instructed, the vector setting part may output a zero vector as V1, and the interpolated frame creation part may create an interpolated frame by the use of V1.

Also, note that in the above-mentioned embodiments, it is configured such that a vector from a reference block to a corresponding block is detected as a motion vector in the vector calculation part, but a vector from the corresponding block to the reference block may be used as a motion vector. In that case, it may be assumed that when T2=0 and T3=10, V1 is represented by (0, −10) (i.e., V1=(0, −10)).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-039033, filed on Feb. 23, 2009, which is hereby incorporated by reference herein in its entirety.

What is claimed is:

1. An image display system comprising:
   a generation unit configured to generate a video signal which is composed of a partial image cut out from an image;
   a display unit configured to display a video signal input from said generation unit at a frame rate higher than that of said input video signal by creating an interpolated frame based on a motion vector;
   a movement unit configured to move a cut-out position of said partial image;
   an output unit configured to output movement information including at least information indicative of the direction of movement of said cut-out position, according to movement of said cut-out position by said movement unit; and
   a setting unit configured to set a motion vector used for the creation of said interpolated frame by using said movement information;
   wherein said display unit determines, from said movement information input from said output unit, whether said input video signal is a video signal of which said cut-out position has been moved, and creates said interpolated frame on the bases of said motion vector set by said setting unit in cases where it is determined that said input video signal is a video signal of which said cut-out position has been moved.

2. The image display system according to claim 1, further comprising:
   a calculation unit configured to calculate a motion vector by means of a block matching method with the use of two temporally continuous frames; and
   a selection unit configured to select either a motion vector calculated by said calculation unit or a motion vector set by said setting unit as a motion vector used for the creation of an interpolated frame;
   wherein said selection unit selects said motion vector set by said setting unit in cases where it is determined from said movement information input from said output unit that said input video signal is a video signal of which said cut-out position has been moved.

3. The image display system according to claim 2, wherein said partial image contains a superimposition image that is superimposed at a predetermined position in said partial image;
   wherein said output unit further outputs, regional information indicating a region in which said superimposition image is superimposed;
   wherein said setting unit sets, as a zero vector region, a region for which a motion vector having a magnitude of 0 is used at the time when said interpolated frame is created, by using said regional information; and
   wherein in cases where said motion vector set by said setting unit is selected by said selection unit, at the time when said interpolated frame is created, said display unit uses a motion vector having a magnitude of 0 within said zero vector region and uses said motion vector set by said setting unit in regions other than said zero vector region.

4. The image display system according to claim 1, wherein said movement information further includes information indicating the speed of movement of said cut-out position; and wherein said setting unit sets a motion vector used for the creation of said interpolated frame by using information indicating said direction of movement and information indicating said speed of movement.

5. An image display apparatus which is connectable to a video output apparatus that outputs a video signal, said image display apparatus comprising:

an acquisition unit configured to acquire, from said video output apparatus, movement information which at least includes information indicating the direction of movement of a cut-out position of a partial image cut out from an image, together with said video signal composed of said partial image;

a display unit configured to display said video signal acquired by said acquisition unit at a frame rate higher than that of said acquired video signal by creating an interpolated frame based on a motion vector; and a setting unit configured to set a motion vector used for the creation of said interpolated frame by using said movement information;

wherein said display unit determines, from said movement information acquired by said acquisition unit, whether said acquired video signal is a video signal of which said cut-out position has been moved, and creates said interpolated frame on the bases of said motion vector set by said setting unit in cases where it is determined that said acquired video signal is a video signal of which said cut-out position has been moved.

6. The image display apparatus according to claim 5, further comprising:

a calculation unit configured to calculate a motion vector by means of a block matching method with the use of two temporally continuous frames; and a selection unit configured to select either a motion vector calculated by said calculation unit or a motion vector set by said setting unit as a motion vector used for the creation of an interpolated frame;

wherein said selection unit selects said motion vector set by said setting unit in cases where it is determined from said movement information acquired by said acquisition unit that said acquired video signal is a video signal of which said cut-out position has been moved.

7. The image display apparatus according to claim 6, wherein said partial image contains a superimposition image that is superimposed at a predetermined position in said partial image;

wherein said acquisition unit further acquires, together with said video signal, regional information indicating a region in which said superimposition image is superimposed;

wherein said setting unit sets, as a zero vector region, a region for which a motion vector having a magnitude of 0 is used at the time when said interpolated frame is created, by using said regional information; and wherein in cases where said motion vector set by said setting unit is selected by said selection unit, at the time when said interpolated frame is created, said display unit uses a motion vector having a magnitude of 0 within said zero vector region, and uses said motion vector set by said setting unit within a region other than said zero vector region.

8. The image display apparatus according to claim 5, wherein said movement information further includes information indicating the speed of movement of said cut-out position; and wherein said setting unit sets a motion vector used for the creation of said interpolated frame by using information indicating said direction of movement and information indicating said speed of movement.

9. A control method of an image display apparatus which is connectable to a video output apparatus that outputs a video signal, said control method comprising:

acquiring, from said video output apparatus, movement information which at least includes information indicating the direction of movement of a cut-out position of a partial image cut out from an image, together with said video signal composed of said partial image cut;

displaying said video signal acquired by said acquiring at a frame rate higher than that of said acquired video signal by creating an interpolated frame based on a motion vector; and setting a motion vector used for the creation of said interpolated frame by using said movement information, wherein in said displaying, it is determined, from said movement information acquired by said acquiring, that whether said acquired video signal is a video signal of which said cut-out position has been moved, and the interpolated frame is created on the bases of said motion vector set by said setting in cases where it is determined that said acquired video signal is a video signal of which said cut-out position has been moved.

10. The control method according to claim 9, further comprising:

calculating a motion vector by means of a block matching method with the use of two temporally continuous frames; and selecting either a motion vector calculated by said calculating or a motion vector set by said setting as a motion vector used for the creation of an interpolated frame;

wherein in said selecting, said motion vector set by said setting is selected in cases where it is determined from said movement information acquired by said acquiring that said acquired video signal is a video signal of which said cut-out position has been moved.

11. The control method according to claim 10, wherein said partial image contains a superimposition image that is superimposed at a predetermined position in said partial image;

wherein in said acquiring, regional information indicating a region in which said superimposition image is superimposed is further acquired together with said video signal;

wherein in said setting, a region for which a motion vector having a magnitude of 0 is used at the time when said interpolated frame is created is set as a zero vector region by using said regional information; and wherein in cases where said motion vector set by said setting is selected by said selecting, at the time when said interpolated frame is created, in said displaying, a motion vector having a magnitude of 0 is used within said zero vector region, and said motion vector set by said setting is used within a region other than said zero vector region.

12. The control method according to claim 9, wherein said movement information further includes information indicating the speed of movement of said cut-out position; and wherein in said setting, a motion vector used for the creation of said interpolated frame is set by using information indicating said direction of movement and information indicating said speed of movement.

* * * * *